US006941942B2

(12) United States Patent
Eisinger et al.

(10) Patent No.: US 6,941,942 B2
(45) Date of Patent: Sep. 13, 2005

(54) NON-ROUND CHARCOAL GRILL WITH ASH CATCHER

(75) Inventors: John C. Eisinger, Chicago, IL (US); Mike Nipke, Calidonia, MI (US)

(73) Assignee: Vendor Development Group, Inc., Grand Rapids, MI (US)

( * ) Notice: Subject to any disclaimer, the term of this patent is extended or adjusted under 35 U.S.C. 154(b) by 19 days.

(21) Appl. No.: 10/791,253

(22) Filed: Mar. 2, 2004

(65) Prior Publication Data

US 2004/0168581 A1 Sep. 2, 2004

Related U.S. Application Data

(63) Continuation of application No. 10/016,891, filed on Dec. 14, 2001, now abandoned.
(60) Provisional application No. 60/288,581, filed on May 3, 2001, and provisional application No. 60/255,779, filed on Dec. 15, 2000.

(51) Int. Cl.[7] ................................................ A47J 37/07
(52) U.S. Cl. ...................... 126/25 R; 126/245; 220/751
(58) Field of Search ...................... 126/30, 9 B, 275 R, 126/25 R, 245; 220/751; 248/317

(56) References Cited

U.S. PATENT DOCUMENTS

| 101,177 A | 3/1870 | Stevenson |
|---|---|---|
| RE4,652 E | 11/1871 | Roe |
| 479,652 A | 7/1892 | Marcee |
| 678,024 A | 7/1901 | Norpis |
| 758,472 A | 4/1904 | Reams |
| 1,055,311 A | 3/1913 | Blount |
| D44,522 S | 8/1913 | Curtiss |
| 1,394,228 A | 10/1921 | Sheridan |
| 1,460,928 A | 7/1923 | Tiden |
| 1,462,578 A | 7/1923 | Kashinsky |
| 1,596,367 A | 8/1926 | Miller |
| 1,783,183 A | 12/1930 | Dibble |
| 2,032,221 A | 2/1936 | Myers |

(Continued)

OTHER PUBLICATIONS

Meco Owner's Manual, copyright 1995, "Meco Swinger Grill".
Merchandising, vol. 6, Jan. 1981, p. 113, "Structo Barbecue Grill".

* cited by examiner

Primary Examiner—Alfred Basichas
(74) Attorney, Agent, or Firm—McAndrews, Held & Malloy, Ltd.

(57) ABSTRACT

A non-round charcoal grill system is provided. The system includes a pan including a perimeter, a generally vertical wall, a generally horizontal base including an aperture, and a slope from the wall to the aperture. A removable receptacle for catching ashes may be positioned under the aperture. The receptacle may be slidably positioned along a mounting attached to the pan or the receptacle may be removably positioned into the aperture by a removal fixture attached to the receptacle. The pan and receptacle may be installed in a cart. The cart may include a frame which has an interior perimeter and the interior perimeter of the cart is smaller than the perimeter of the pan.

4 Claims, 14 Drawing Sheets

U.S. PATENT DOCUMENTS

| | | |
|---|---|---|
| 2,182,663 A | 12/1939 | Eby et al. |
| 2,274,433 A | 2/1942 | Schulz |
| 2,314,791 A | 3/1943 | Jones |
| 2,347,980 A | 5/1944 | Apfelbaum |
| D139,850 S | 12/1944 | Frenning |
| 2,431,905 A | 12/1947 | Anicetti |
| 2,511,594 A | 6/1950 | Loffredo |
| 2,512,223 A | 6/1950 | Contiguglia |
| D163,090 S | 5/1951 | Campbell |
| D165,497 S | 12/1951 | Waas |
| D165,998 S | 2/1952 | Pollard |
| 2,600,234 A | 6/1952 | Foley |
| 2,621,586 A | 12/1952 | Roney |
| 2,641,243 A | 6/1953 | Goss |
| 2,666,425 A | 1/1954 | Hesting, Jr. |
| D171,639 S | 3/1954 | Clemens, Jr. |
| 2,728,334 A | 12/1955 | Paolella |
| 2,746,378 A | 5/1956 | Lang |
| D179,345 S | 12/1956 | Henry |
| 2,780,392 A | 2/1957 | Nonhof |
| 2,787,995 A | 4/1957 | Alter |
| 2,886,386 A | 5/1959 | Spitzer |
| 2,920,614 A | 1/1960 | Phelps |
| 2,932,479 A | 4/1960 | Leach |
| D188,879 S | 9/1960 | Gauss et al. |
| D189,682 S | 1/1961 | Bloomfield |
| D192,199 S | 2/1962 | Watson et al. |
| 3,025,848 A | 3/1962 | Malgesini |
| D193,163 S | 7/1962 | Levi |
| 3,046,970 A | 7/1962 | Seaman |
| 3,073,263 A | 1/1963 | Wynkoop |
| D196,552 S | 10/1963 | Mayer |
| D196,996 S | 11/1963 | Kates |
| 3,111,337 A | 11/1963 | Kates |
| 3,126,881 A | 3/1964 | Blotsky, Jr. |
| D198,822 S | 8/1964 | Lyemance |
| D200,137 S | 1/1965 | Hanna |
| 3,167,642 A | 1/1965 | Reis |
| 3,200,806 A | 8/1965 | Goldstein |
| 3,209,743 A | 10/1965 | Stewart et al. |
| 3,216,379 A | 11/1965 | Durfee |
| 3,217,634 A | 11/1965 | Fox |
| 3,276,440 A | 10/1966 | Sazegar |
| D207,567 S | 5/1967 | Helgeson |
| D208,179 S | 7/1967 | King et al. |
| 3,330,266 A | 7/1967 | Stephen |
| 3,380,444 A | 4/1968 | Stalker |
| 3,385,281 A | 5/1968 | O'Russa |
| D211,919 S | 8/1968 | Harff et al. |
| D214,220 S | 5/1969 | Ver Halen |
| 3,453,975 A | 7/1969 | Gunter |
| D215,250 S | 9/1969 | McClaren |
| 3,499,399 A | 3/1970 | Kaufmann |
| 3,500,812 A | 3/1970 | Korngold |
| 3,520,290 A | 7/1970 | Winters |
| 3,533,393 A | 10/1970 | Haapanen |
| 3,538,906 A | 11/1970 | Heraty et al. |
| D219,413 S | 12/1970 | Glaser |
| D219,629 S | 12/1970 | Koziol |
| D219,693 S | 1/1971 | Hahn |
| 3,567,065 A | 3/1971 | Dinse |
| D222,311 S | 10/1971 | Wilkinson et al. |
| 3,611,910 A | 10/1971 | Hughes |
| 3,611,915 A | 10/1971 | Glaser |
| 3,617,022 A | 11/1971 | Wiggins |
| D223,042 S | 2/1972 | Wilkinson et al. |
| 3,638,634 A | 2/1972 | Bolitho |
| 3,683,791 A | 8/1972 | Rast |
| 3,688,758 A | 9/1972 | Stephen, Jr. |
| 3,714,937 A | 2/1973 | Linstead |
| 3,734,076 A | 5/1973 | Kiziol |
| D227,643 S | 7/1973 | Koziol |
| 3,759,164 A | 9/1973 | Robinson |
| D229,625 S | 12/1973 | Thomas |
| D229,660 S | 12/1973 | Gammon |
| 3,785,275 A | 1/1974 | Keats et al. |
| 3,791,368 A | 2/1974 | Hunt |
| D231,070 S | 4/1974 | Koziol |
| 3,806,987 A | 4/1974 | Koziol |
| 3,812,840 A | 5/1974 | Whaler |
| D231,892 S | 6/1974 | Warshauer |
| 3,822,456 A | 7/1974 | Petruzzi |
| 3,841,299 A | 10/1974 | Tomita |
| D233,585 S | 11/1974 | Thomas |
| 3,865,052 A | 2/1975 | Streets et al. |
| D237,578 S | 11/1975 | Thomas |
| 3,974,821 A | 8/1976 | Storandt |
| 3,981,292 A | 9/1976 | Lilly et al. |
| D243,309 S | 2/1977 | Reunanen |
| 4,008,971 A | 2/1977 | Wah et al. |
| 4,034,662 A | 7/1977 | McLane |
| 4,083,641 A | 4/1978 | Sado |
| D250,317 S | 11/1978 | Simmons |
| D251,230 S | 3/1979 | Adams |
| D252,248 S | 7/1979 | Huff |
| 4,192,283 A | 3/1980 | Kridler |
| 4,209,006 A | 6/1980 | Marsalko |
| D255,863 S | 7/1980 | Futch |
| 4,227,510 A | 10/1980 | Frazier et al. |
| 4,273,096 A | 6/1981 | Hannebaum |
| 4,281,633 A | 8/1981 | Wackerman |
| 4,302,181 A | 11/1981 | Schlosser |
| 4,331,123 A | 5/1982 | Alles et al. |
| 4,331,127 A | 5/1982 | Grosso |
| 4,332,188 A | 6/1982 | Rhear |
| 4,332,235 A | 6/1982 | Hannebaum |
| 4,337,751 A | 7/1982 | Sampson et al. |
| 4,340,002 A | 7/1982 | Hanyu et al. |
| 4,340,027 A | 7/1982 | Fuss |
| 4,353,347 A | 10/1982 | Seed |
| 4,362,093 A | 12/1982 | Griscom |
| 4,382,432 A | 5/1983 | Lizdas |
| 4,390,002 A | 6/1983 | Daily, III |
| D269,758 S | 7/1983 | Braswell |
| D269,839 S | 7/1983 | Givens, III |
| D270,988 S | 10/1983 | Anderson |
| 4,453,530 A | 6/1984 | Schlosser |
| 4,458,585 A | 7/1984 | Erbach |
| 4,463,746 A | 8/1984 | Knuth et al. |
| 4,498,452 A | 2/1985 | Schlosser et al. |
| D278,021 S | 3/1985 | Schlosser et al. |
| 4,510,916 A | 4/1985 | Ogden |
| 4,523,574 A | 6/1985 | Schlosser |
| D279,537 S | 7/1985 | Taylor et al. |
| D280,282 S | 8/1985 | Erbach |
| 4,535,749 A | 8/1985 | Schlosser |
| 4,553,524 A | 11/1985 | Wheat et al. |
| D282,619 S | 2/1986 | Fitzgerald et al. |
| 4,567,876 A | 2/1986 | Ogden |
| 4,576,140 A | 3/1986 | Schlosser |
| 4,593,676 A | 6/1986 | Wackerman |
| D284,929 S | 8/1986 | Schlosser et al. |
| 4,603,679 A | 8/1986 | Ogden |
| 4,630,593 A | 12/1986 | Gremillion |
| 4,635,613 A | 1/1987 | Tucker et al. |
| 4,667,916 A | 5/1987 | Richards |
| 4,667,964 A | 5/1987 | Hickey |
| 4,683,866 A | 8/1987 | Bales et al. |
| 4,688,541 A | 8/1987 | Stephen et al. |
| D291,855 S | 9/1987 | Erbach et al. |
| 4,699,120 A * | 10/1987 | Ogden ...................... 126/25 A |

| | | |
|---|---|---|
| D293,067 S | 12/1987 | Stephen et al. |
| D293,191 S | 12/1987 | Stephen et al. |
| 4,718,399 A | 1/1988 | Shepherd |
| 4,727,853 A | 3/1988 | Stephen et al. |
| D295,135 S * | 4/1988 | Ogden .................. D7/334 |
| 4,735,390 A | 4/1988 | Richards |
| 4,741,322 A | 5/1988 | Lin |
| 4,762,114 A | 8/1988 | Blankemeyer |
| 4,763,640 A | 8/1988 | Schnack et al. |
| 4,777,927 A | 10/1988 | Stephen et al. |
| D298,406 S | 11/1988 | Stephen et al. |
| 4,793,580 A | 12/1988 | Richards |
| D299,690 S | 2/1989 | Schnack et al. |
| 4,829,978 A | 5/1989 | Schlosser et al. |
| D301,673 S | 6/1989 | Ogden |
| 4,836,179 A | 6/1989 | Schlosser et al. |
| D302,641 S | 8/1989 | Elmburg |
| 4,860,724 A | 8/1989 | Schlosser et al. |
| 4,924,845 A | 5/1990 | Johnson et al. |
| 4,926,841 A | 5/1990 | Woolf |
| 4,941,817 A | 7/1990 | Schlosser |
| 4,942,862 A | 7/1990 | Alden et al. |
| 4,966,125 A | 10/1990 | Stephen et al. |
| 4,966,126 A | 10/1990 | Wu |
| D315,079 S | 3/1991 | Jui-Yen |
| D316,355 S | 4/1991 | Stephen et al. |
| 5,016,607 A | 5/1991 | Doolittle et al. |
| 5,027,788 A | 7/1991 | Schlosser |
| 5,036,832 A | 8/1991 | Schlosser |
| 5,044,265 A | 9/1991 | Janssen |
| 5,069,196 A | 12/1991 | Schlosser et al. |
| 5,076,252 A | 12/1991 | Schlosser et al. |
| D322,909 S | 1/1992 | Parent et al. |
| 5,080,313 A | 1/1992 | Byrum et al. |
| D325,315 S | 4/1992 | Pareut et al. |
| D325,316 S | 4/1992 | Pareut et al. |
| D325,318 S | 4/1992 | Parent et al. |
| 5,111,802 A | 5/1992 | Lin |
| D327,390 S | 6/1992 | Schlosser et al. |
| D327,805 S | 7/1992 | Parent et al. |
| 5,159,917 A | 11/1992 | Archer et al. |
| 5,165,385 A | 11/1992 | Doolittle et al. |
| 5,213,075 A | 5/1993 | Stephen et al. |
| 5,299,553 A | 4/1994 | Giebel et al. |
| D350,668 S | 9/1994 | Giebel et al. |
| D351,308 S | 10/1994 | Pai |
| D352,865 S | 11/1994 | Pai |
| D355,566 S | 2/1995 | Stephen et al. |
| 5,394,590 A | 3/1995 | Yu |
| D356,924 S | 4/1995 | Pai |
| 5,566,606 A | 10/1996 | Johnston |
| 5,572,983 A | 11/1996 | Schlosser et al. |
| D376,510 S | 12/1996 | Ting |
| 5,640,949 A | 6/1997 | Smith |
| D381,557 S | 7/1997 | Bradley et al. |
| D381,860 S | 8/1997 | Chiang |
| 5,749,354 A | 5/1998 | Lin |
| D395,785 S | 7/1998 | Lin |
| 5,794,608 A | 8/1998 | Von Berg |
| 5,806,510 A | 9/1998 | Fischer et al. |
| 5,809,991 A | 9/1998 | Pai |
| D404,963 S | 2/1999 | Schlosser et al. |
| 5,865,099 A | 2/1999 | Waugh |
| D409,436 S | 5/1999 | Smith |
| D412,086 S | 7/1999 | Bossler |
| D414,374 S | 9/1999 | Ting |
| D414,980 S | 10/1999 | Pai |
| D415,649 S | 10/1999 | Pai |
| D415,653 S | 10/1999 | Schlosser et al. |
| D415,925 S | 11/1999 | Pai |
| D417,362 S | 12/1999 | Ting |
| 6,000,389 A | 12/1999 | Alpert |
| D420,546 S | 2/2000 | Pai |
| D426,101 S | 6/2000 | Pai |
| D426,419 S | 6/2000 | Kuo |
| D427,840 S | 7/2000 | Pai |
| D428,760 S | 8/2000 | Huang |
| D430,717 S | 9/2000 | Alden et al. |
| D435,387 S | 12/2000 | Pai |
| 6,155,248 A | 12/2000 | Schlosser et al. |
| D435,998 S | 1/2001 | Mak |
| D437,177 S | 2/2001 | Giebel et al. |
| 6,182,559 B1 | 2/2001 | Chiang |
| 6,230,700 B1 | 5/2001 | Daniels et al. |
| 6,357,434 B1 | 3/2002 | Bossler |
| 6,363,925 B1 | 4/2002 | Chavana, Jr. et al. |
| D460,657 S | 7/2002 | Bossler |
| D461,360 S | 8/2002 | Bossler |
| 6,439,221 B1 | 8/2002 | Ward et al. |
| D462,563 S | 9/2002 | Bossler |
| D463,707 S | 10/2002 | Bossler |
| D463,708 S | 10/2002 | Bossler |
| D463,709 S | 10/2002 | Bossler |
| D464,227 S | 10/2002 | Eisinger et al. |
| D464,524 S | 10/2002 | Pai |
| D464,529 S | 10/2002 | Eisinger et al. |
| 6,474,327 B1 | 11/2002 | Bossler |
| D466,359 S | 12/2002 | Bossler et al. |
| D466,756 S | 12/2002 | Bossler et al. |
| D471,396 S | 3/2003 | Chiang |
| 6,557,546 B1 | 5/2003 | Gibbons |
| D476,189 S | 6/2003 | Bossler |
| D478,462 S | 8/2003 | Zhu |
| 6,626,090 B2 * | 9/2003 | McLemore et al. ........... 99/340 |
| D480,906 S | 10/2003 | Pai |
| D481,256 S | 10/2003 | Bossler |
| D482,561 S | 11/2003 | Yeh |
| D485,116 S | 1/2004 | Kwok |
| 6,684,876 B2 * | 2/2004 | Bossler .................. 126/25 R |
| D496,821 S | 10/2004 | Pai |
| D497,281 S | 10/2004 | Pai |

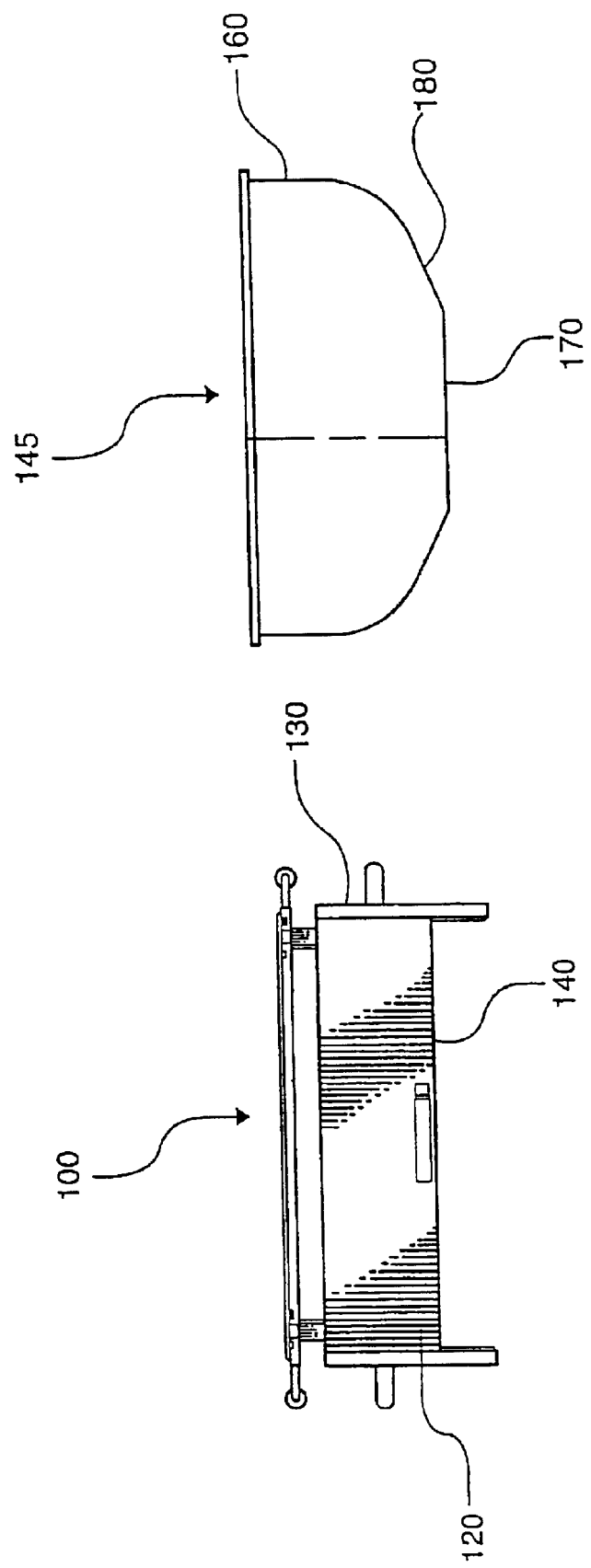

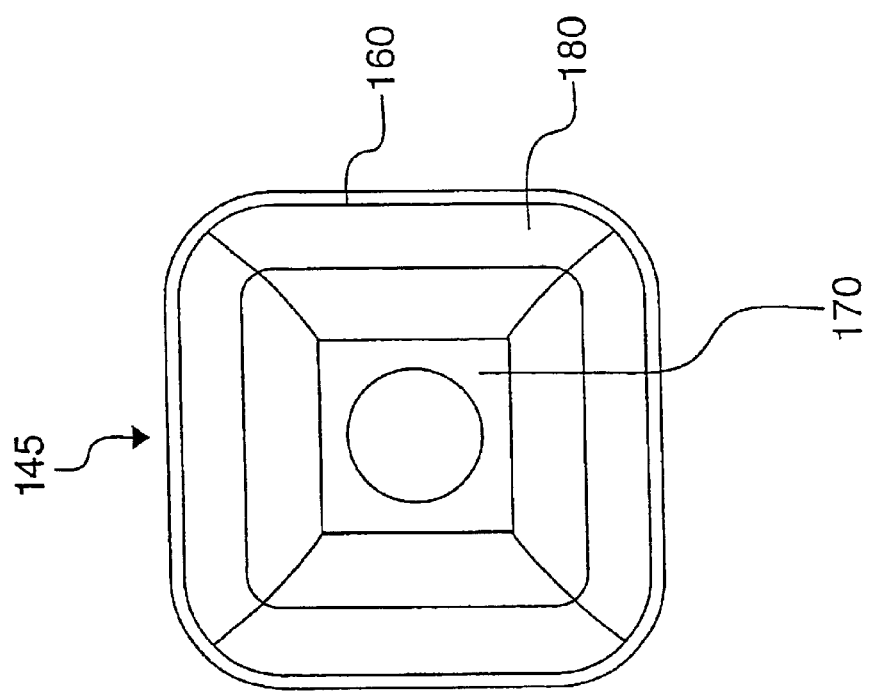

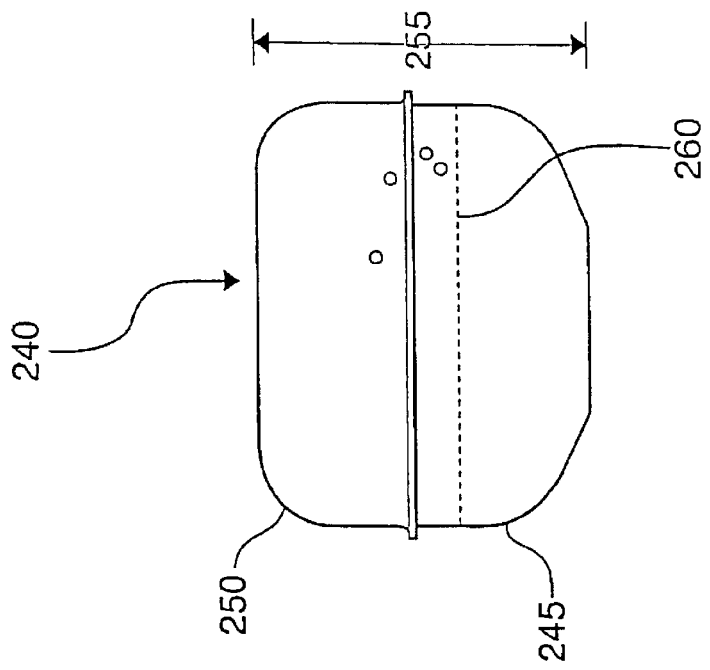
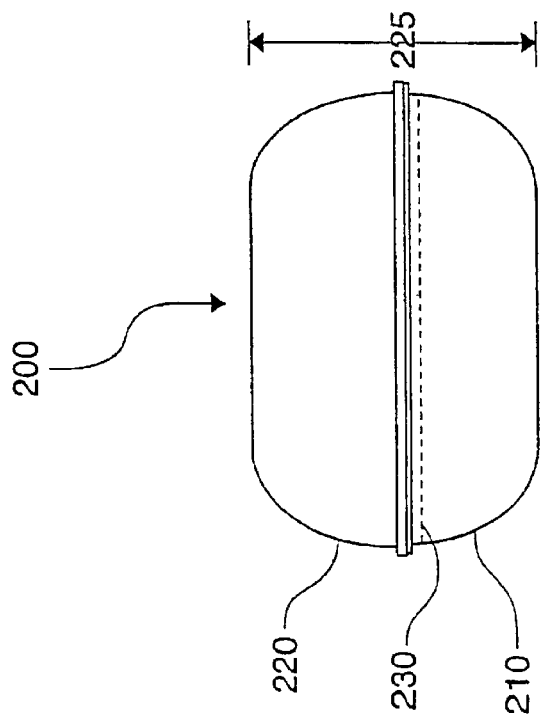

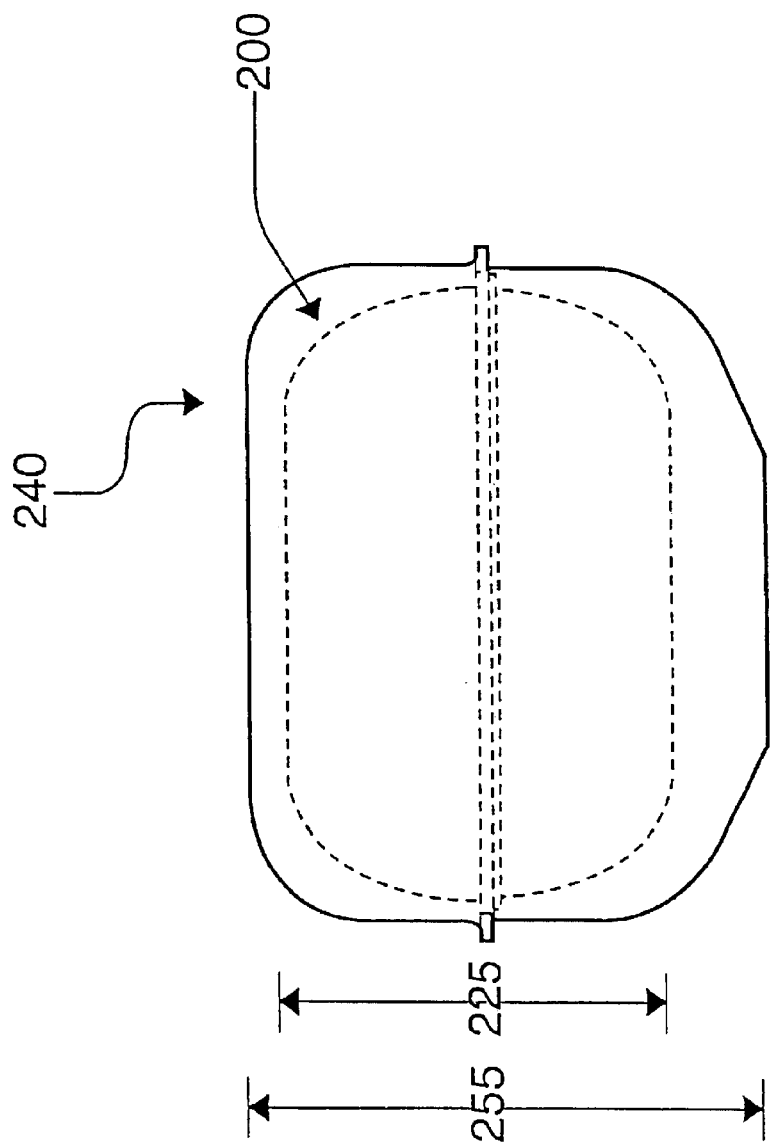

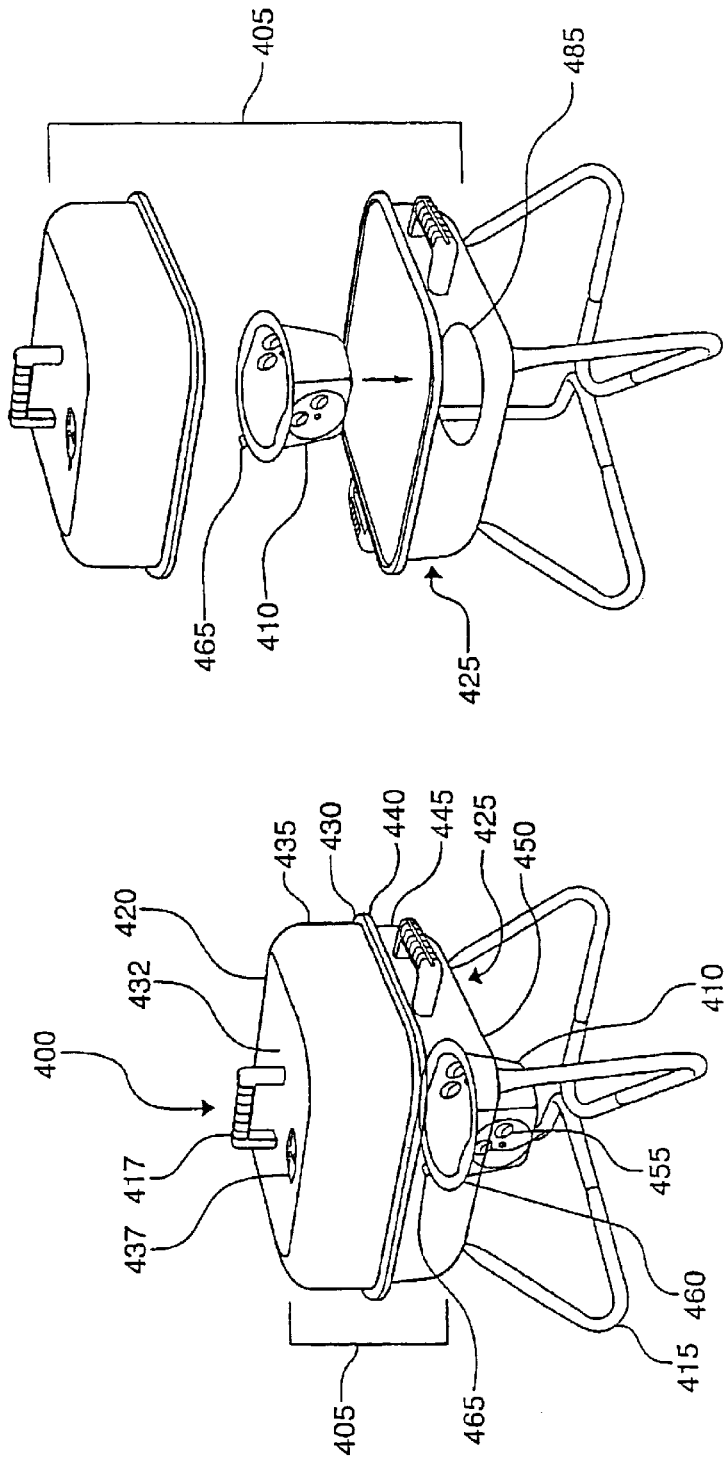

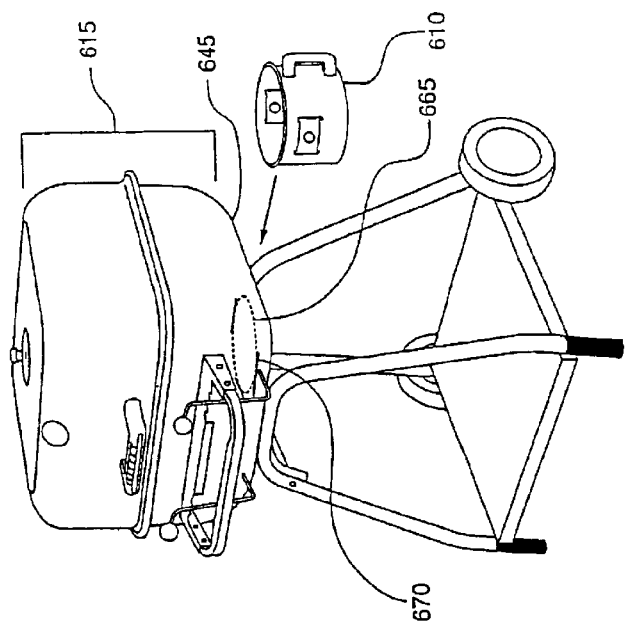
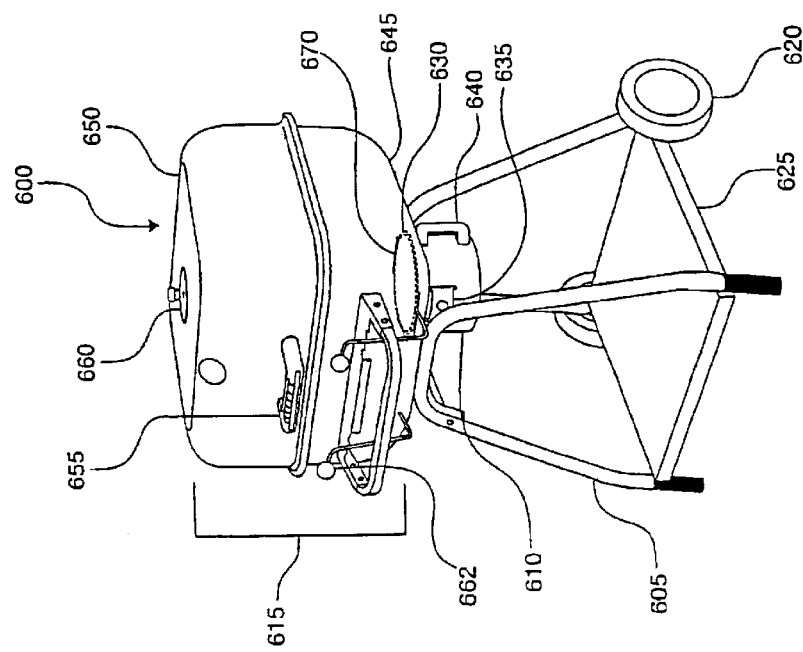

NON-ROUND CHARCOAL GRILL WITH ASH CATCHER

CROSS-REFERENCE TO RELATED APPLICATIONS

This application is a continuation of application Ser. No. 10/016,891, filed Dec. 14, 2001 now abandoned which claims the benefit of U.S. Provisional Application No. 60/288,581, filed May 3, 2001, and U.S. Provisional Application No. 60/255,779, filed Dec. 15, 2000.

BACKGROUND OF THE INVENTION

The present invention generally relates to a charcoal grilling system. More particularly, the present invention presents several points of novelty relating to a system for conveniently removing ashes and grease from a charcoal grill, for providing improved cooking space and performance within the charcoal grill, and for maneuvering the charcoal grill.

Grilling remains one of the most popular methods of food preparation today. Grill assemblies use either gas or charcoal as a heat source. While gas grilling has grown increasingly popular, many people prefer to use a charcoal grill. However, there remain many difficulties associated with charcoal grilling.

A charcoal grill assembly generally includes a bottom bowl, a lid, and legs or a stand. The bottom bowl typically includes a bowl rim, a cooking grid, and a charcoal support grate. The bottom bowl and the lid typically include ventilation apertures. The cooking grid sits slightly under the bowl rim of the bottom bowl. The charcoal support grate sits beneath the cooking grid inside the bottom bowl. The legs or stand support the assembly. The lid may be placed on top of the bottom bowl. In operation, charcoal is positioned on top of the charcoal support grate, and ignited. The cooking grid is then set in the bottom bowl. The grill operator may then position food on the cooking grid. The grill operator may then position the lid on top of the grill bottom bowl to cover the grill assembly. The grill operator may adjust the ventilation apertures to increase or decrease circulation of air into the covered grill assembly and to control the burn rate of the charcoal.

One of the biggest drawbacks associated with a typical charcoal grill assembly is the cleaning of the assembly after cooking. Disposing of the ashes and debris that have fallen to the bottom of the grill bowl during the course of cooking may be a difficult task. To address the problem of cleaning the grill assembly, many spherical grill assemblies include a receptacle for catching ashes situated at the center bottom of the grill bowl. The ash catcher retains ashes and grease, for example, that fall during the course of cooking and that are guided by the grill bowl curvature into the ash catcher. By using the ash catcher, the grill operator may clean the ashes and grease out of the grill by removing the ash catcher, dumping the ash catcher contents and replacing the ash catcher.

The typical non-round charcoal grill, however, does not include a receptacle for catching ashes and grease because the walls and base of the flat grill bottom pan do not direct the ashes and grease to the center of the grill pan base where the ash catcher typically would be located. For example, a rectangular charcoal grill assembly is described in U.S. Des. No. 277,541 issued to Espinda. The flat horizontal base of the grill pan is perpendicular to the generally vertical walls of the grill pan. Because the base of the grill pan is flat, ashes and grease created during the course of cooking stay where the ashes and grease have landed at the base of the grill pan. Likewise, the generally vertical walls of the grill pan guide ashes and grease straight down into the corners where the base of the grill pan and the walls of the grill pan connect. Because the base and walls of the grill pan direct the ashes and grease generally straight down, the ashes and grease are scattered across the entire base of the grill pan. Thus an ash catcher is not included in a typical non-round grill assembly because the non-round assembly does not direct ashes and grease to the center base of the grill pan.

Non-round charcoal grill assemblies are also typically not easy to maneuver. For example, non-round charcoal grill assemblies generally do not include a wheeled cart because non-round charcoal grill assemblies generally do not include ash catchers. Without an ash catcher, a non-round charcoal grill attached to a cart would be difficult to clean. For example, the grill bowl and the cart would possibly have to be inverted to clean out the assembly.

A generally spherical charcoal grill assembly with an ash catcher is described in U.S. Pat. No. 5,865,099 issued to Waugh. The rounded grill pan walls and grill lid walls of the Waugh assembly limit the vertical depth or draw of the grill assembly between the grill bowl and the grill lid. The short draw limits space within the grill assembly for food, heat circulation, and an adjustable cooking grid. A short draw is a problem typical of rounded and non-rounded charcoal grill assemblies alike. For example, the typical charcoal grill assembly includes a grill lid that slopes acutely downward to the grill bowl, so the charcoal grill assembly has a short draw.

A charcoal grill assembly supported by a wheeled cart is described in U.S. Des. 430,717. The frame of the cart envelops the perimeter of the wall of the bottom portion at the rim of the bottom portion. Therefore, the cart takes up considerable space, and so the cart is difficult to maneuver and store. Additionally, the cart includes a large footprint which may be undesirable.

Thus, a need has long existed for a non-round charcoal grill assembly that provides for easy disposal of ashes, grease, and debris. Furthermore, a need exists for a non-round grill assembly that includes a wheeled cart, so that the grill operator may easily maneuver the grill assembly. Additionally, a need exists for a non-round charcoal grill assembly that provides improved space for cooking a variety of foods, for improved ventilation and an improved charcoal burn rate, and for an adjustable cooking grid. Finally, a need exists for a non-round grill assembly cart that takes up less space than typical grill assembly carts.

SUMMARY OF THE INVENTION

The preferred embodiment of the present invention provides a non-round charcoal grilling system. The system includes a pan having a perimeter, a generally vertical wall, a generally horizontal base including an aperture and a substantial slope leading from the wall to the aperture in the base. A removable receptacle for catching ashes or ash catcher may be positioned under the aperture. The removable ash catcher may be slidably positioned under the aperture along a mounting attached to the pan. Alternatively, the removable ash catcher may be positioned into the aperture and removed from the aperture by using a removal fixture attached to the ash catcher. The pan including the ash catcher may be installed in a grill cart. The cart may have a frame which includes an interior perimeter and the interior perimeter of the frame is smaller than the perimeter of the pan.

These and other features of the present invention are discussed or apparent in the following detailed description of the preferred embodiments of the invention.

BRIEF DESCRIPTION OF THE DRAWINGS

FIG. 1a illustrates a profile of a typical non-round charcoal grill assembly.

FIGS. 1b and 1c illustrate a profile and top view, respectively, of a charcoal grill pan according to a preferred embodiment of the present invention.

FIG. 2a illustrates a profile of a typical non-round charcoal grill assembly.

FIG. 2b illustrates a profile of a charcoal grill assembly according to a preferred embodiment of the present invention.

FIG. 2c illustrates a cutaway profile of the charcoal grill assembly of FIG. 2b and a profile of the charcoal grill assembly of FIG. 2a according to a preferred embodiment of the present invention.

FIG. 4a illustrates a charcoal grill assembly according to a preferred embodiment of the present invention.

FIG. 4b illustrates an exploded view of the ash catcher and the grill body of FIG. 4a according to a preferred embodiment of the present invention.

FIG. 6a illustrates a wheeled charcoal grill assembly according to a preferred embodiment of the present invention.

FIG. 6b illustrates the ash catcher removed from the grill body of FIG. 6a according to a preferred embodiment of the present invention.

DETAILED DESCRIPTION OF THE PREFERRED EMBODIMENTS

Figure 2D:
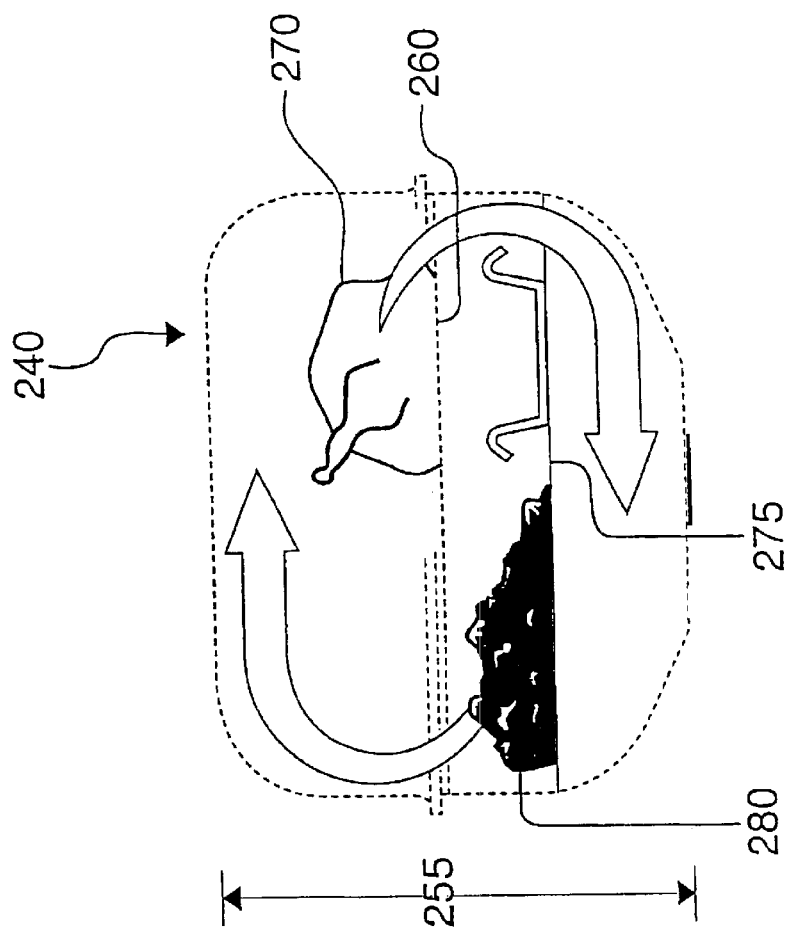
FIG. 2d illustrates a cutaway profile of the charcoal grill assembly of FIG. 2b according to a preferred embodiment of the present invention.

FIG. 1a illustrates a profile of a typical non-round charcoal grill assembly 100. The assembly 100 includes a grill pan 120. The grill pan 120 includes a flat wall 130 and a flat grill pan base 140. In operation ashes and grease collect on the flat grill pan base 140 during the course of cooking and must be scooped out manually.

FIGS. 1b and 1c illustrate a profile and top view, respectively, of a charcoal grill pan 145 according to a preferred embodiment of the present invention. The grill pan 145 includes a vertical wall portion 160, a bottom portion 170, and an angled wall portion 180. The wall portion 160, bottom portion 170, and angled wall portion 180 form a slope in the grill pan 145. The bottom portion 170 includes an opening that encompasses substantially the whole bottom portion 170. A receptacle for catching ashes and grease as described below may be positioned beneath or within the opening in the bottom portion 170. In operation, the slope of the four-corner three-angle grill pan 145 leads ashes and other debris that fall into the grill pan 145 during the course of cooking toward the center of the bottom portion 170 of the grill pan 145. The three-angle grill pan 145 is a significant improvement of the prior art because the three-angle grill pan 145 may include an ash catcher attachment which would allow the grill operator to clean the ashes and grease out of the grill pan 145 by removing the ash catcher. In contrast, the flat base 140 of the assembly 100 does not direct ashes, and thus does not include an ash catcher.

FIG. 2a illustrates a profile of a typical non-round charcoal grill assembly 200. The assembly 200 includes a grill pan 210, a grill lid 220, and a vertical extent 225. The grill pan 210 includes an adjustable cooking grid 230, a heat source (not shown), and grid adjustment levers (not shown). In operation, the adjustable cooking grid 230 sits over the heat source in the grill pan 210. Food may be placed on top of the adjustable cooking grid 230. The adjustable cooking grid 230 may be lowered and raised within the grill pan 210 by the grid adjustment levers.

FIG. 2b illustrates a profile of a charcoal grill assembly 240 according to a preferred embodiment of the present invention. The assembly 240 includes a grill pan 245, a grill lid 250, and a vertical extent 255. The grill pan 245 includes an adjustable cooking grid 260, a heat source (not shown), and grid adjustment levers (not shown). The vertical extent 255 or draw of the assembly 240 is greater than the vertical extent 225 of the assembly 200 of FIG. 2a.

In operation, the adjustable cooking grid 260 sits over the heat source in the grill pan 245. Food may be placed on top of the adjustable cooking grid 260. The adjustable cooking grid 260 may be lowered and raised within the grill pan 245 by the grid adjustment levers. The deeper draw of the assembly 240 provides several advantages over the prior art. Because of the deeper draw of the assembly 240, the grill operator may raise or lower the adjustable cooking grid 260 over a greater range of distances. Therefore, the grill operator may cook food at a greater variety of distances from the heat source, so the grill operator has more control over how food is cooked. Additionally, the deeper draw of the assembly 240 provides more space for food and assists in cooking by improving circulation and the burn rate within the assembly 240.

FIG. 2c illustrates a superimposed cutaway profile of the charcoal grill assembly 240 of FIG. 2b and the profile of the prior art charcoal grill assembly 200 of FIG. 2a according to a preferred embodiment of the present invention. As shown, the vertical extent 255 of the charcoal grill assembly 240 of the preferred embodiment is much greater than the vertical extent 225 of the prior art assembly. As mentioned above, because of the increased vertical extent or deeper draw of the grill assembly 240 the grill assembly 240 is able to provide improved control to a user and improved cooking results, for example due to improved convection.

FIG. 2d illustrates a cutaway profile of the charcoal grill assembly 240 of FIG. 2b according to a preferred embodiment of the present invention. The grill assembly 240 is shown to include an exemplary food item 270, a charcoal support grate 275, and a heat source 280. The adjustable cooking grid 260 is positioned above the charcoal support grate 275 within the grill assembly 240. The heat source 280 is positioned on top of the charcoal support grate 275 and the food 270 is positioned on top of the adjustable cooking grid 260. In operation, the large vertical extent 255 or deep draw of the assembly 240 provides improved space for heat to circulate within the assembly 240 as compared to the prior art. For example, because the vertical extent 255 improves the heat circulation within the assembly 240, the food 270 may be cooked more evenly and faster than the food 270 would be in the assembly 200 of FIG. 2a.

FIG. 4a illustrates a charcoal grill assembly 400 according to a preferred embodiment of the present invention. The assembly 400 includes a grill body 405, a receptacle for catching ashes or ash catcher 410, and legs 415. The grill body 405 includes handles 417, a grill lid 420, and a four-corner three-angle grill pan 425. The grill lid 420 includes a grill lid rim 430, a grill lid top 432, a grill lid wall 435, and an adjustable vent 437. The grill pan 425 includes a grill pan groove 440, a grill pan wall 445, a grill pan base 450, a charcoal support grate (not shown), and an adjustable cooking grid (not shown). The ash catcher 410 includes two adjustable vents 455, a ring collar 460, and a removal fixture, such as a tab 465.

The grill lid 420 covers the grill pan 425 as is illustrated in FIG. 4a. That is, the grill lid 420 rests upon the grill pan 425 when the grill lid rim 430 is positioned in alignment with the grill pan groove 440. The general shape of the grill lid 420 and the grill pan 425 is non-round or preferably rectangular or square. The distance or draw between the grill lid top 432 and grill pan base 450 is, as described above, greater than the draw found in the typical charcoal grill. The grill pan wall 445 slopes into the grill pan base 450 as described above.

In operation, charcoal may be placed on the charcoal support grate in the grill pan 425 and ignited. The adjustable cooking grid may then be placed in the grill pan 425 at a desired height. Food may then be placed above the lit charcoal on the adjustable cooking grid. The grill body 405 may then optionally be covered by positioning the grill lid 420 atop the grill pan 425. The grill lid 420 is positioned by using the handle 417 fastened to the grill lid 420 to rest the grill lid 420 upon the grill pan 425. The heat from the charcoal cooks the food. During the course of cooking, air may be circulated into the covered grill body 405 by adjusting the vent 437 and the ash catcher vents 455. Ashes and grease created during the course of cooking are guided into the ash catcher 410 by the sloped grill pan wall 445. When the cooking has ended, the handle 417 may be used to lift the grill lid 420 up off of the grill pan 425. The food, adjustable cooking grid, and charcoal support grate may then be removed from the grill pan 425. Additionally, the ash catcher 410 may also be removed as described below.

FIG. 4b illustrates an exploded view of the ash catcher 410 and the grill body 405 of FIG. 4a according to a preferred embodiment of the present invention. The grill pan 425 includes an ash catcher insert aperture 485. The ash catcher 410 may be removed from the grill pan 425 by gripping the removal fixture, the tab 465, and pulling the tab 465 generally upward. As the tab 465 is pulled upward, the ash catcher 410 is lifted up and out of the insert aperture 485. After being removed from the grill body 405, the ash catcher 410 may be easily cleaned. For example, the ash catcher 410 may be inverted, and the ashes may be removed. The ash catcher 410 may then be replaced within the insert aperture 485 of the grill pan 425.

The addition of a receptacle for catching ashes and grease to a non-round charcoal grill assembly is a major improvement over previous non-round charcoal grill assemblies. The ash catcher allows the grill operator to conveniently clean the non-round grill assembly, whereas before the grill operator may have had to clean the non-round grill assembly by reaching into the filthy grill pan or inverting the assembly and dumping out the contents. Of course, the addition of the ash catcher to a non-round charcoal grill assembly is made possible by the slope of the four-corner three-angle grill pan shown in FIG. 1b.

In another embodiment, similar to the sliding ash catcher embodiment shown below in FIGS. 6a and 6b, an ash catcher that is directly removable from the outside of the grill body 405 may be employed. For example, the grill pan base 450 may include a mounting fastened to the underside of the grill pan base 450 and used to position the removable ash catcher 410 underneath the insert aperture 485 as shown in FIGS. 6a14 c. Thus, the ash catcher 410 may then be slidably positioned and removed for cleaning.

Figure 5B:
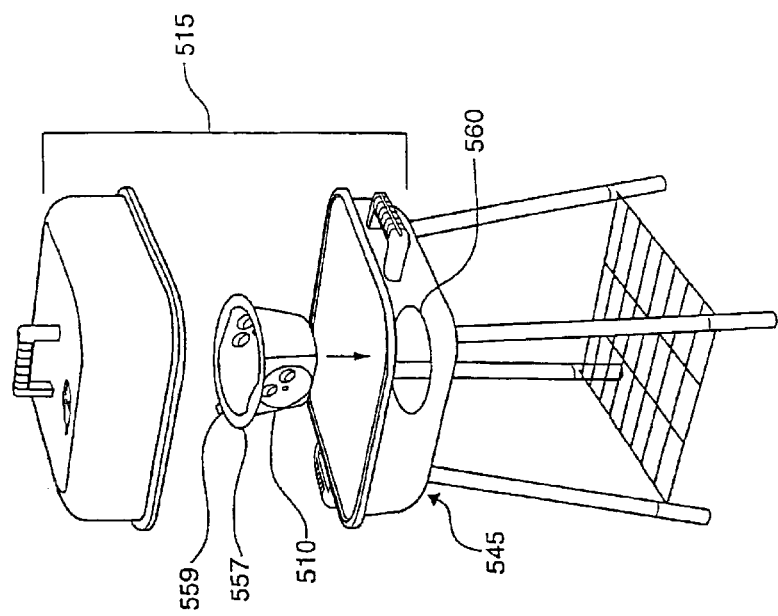
FIG. 5b illustrates an exploded view of the ash catcher and the grill body of FIG. 5a according to a preferred embodiment of the present invention.
Figure 5A:
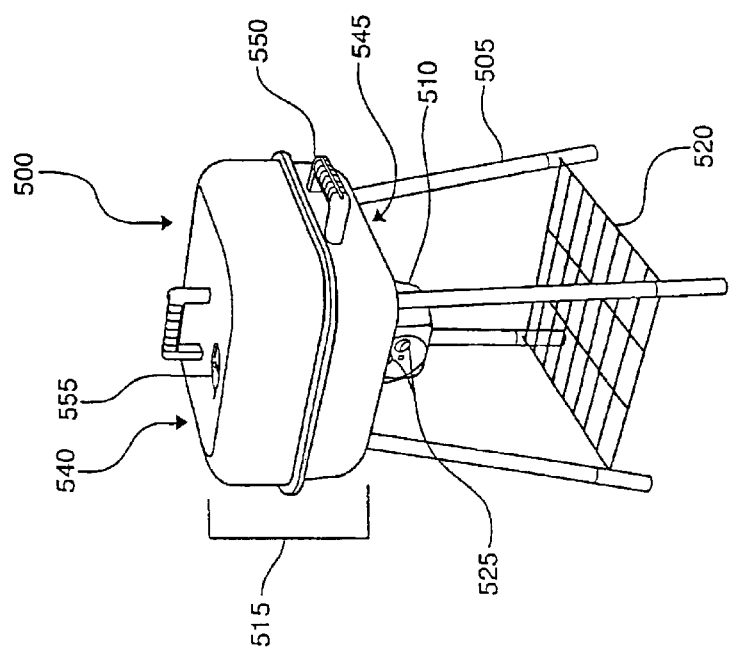
FIG. 5a illustrates a charcoal grill assembly according to a preferred embodiment of the present invention.

FIG. 5a illustrates a charcoal grill assembly 500 according to a preferred embodiment of the present invention. The assembly 500 includes legs 505, a receptacle for catching ashes or ash catcher 510, and a charcoal grill body 515. The legs 505 include a storage plate 520. The ash catcher 510 includes two adjustable vents 525, a ring collar (not shown), and a tab (not shown). The charcoal grill body 515 includes a top portion 540, a four-corner three-angle bottom portion 545, handles 550, and an adjustable vent 555. The bottom portion 545 includes an adjustable cooking grid (not shown).

The ash catcher 510 and the grill body 515 are generally similar to the ash catcher 410 and the grill body 405 of FIGS. 4a and 4b. The general shape of the grill body 515 is non-round or preferably rectangular or square. The vertical extent or draw is, as described above, greater then the vertical extent found in a typical charcoal grill. The three-angle bottom portion 545 directs ashes and grease to the center of the bottom portion 545 as described above.

In operation, the assembly 500 performs similarly to the assembly 400 of FIG. 4. The handle 550 attached to the top portion 540 may be used to remove or position the top portion 540 as described above. The adjustable cooking grid may be positioned in the bottom portion 545 at a desired height. During the course of cooking, air may be circulated into the covered grill body 515 by adjusting the vent 555 and the vents 525 of the ash catcher 510. The long legs 505 provide the grill operator with easy access to the assembly 500 and space for a storage plate 520. The storage plate 520 may hold food, fuel, or other items and provide support to the legs 505.

FIG. 5b illustrates an exploded view of the ash catcher 510 and the grill body 515 of FIG. 5a according to a preferred embodiment of the present invention. As shown in FIG. 5b, the ash catcher 510 includes a ring collar 557 and a tab 559. The bottom portion 545 includes an insert aperture 560. The ash catcher 510 is positioned into the insert aperture 560 and pulled out of the insert aperture 560 from above by use of the tab 559 as described above with regard to FIG. 4b.

The addition of a receptacle for catching ashes and grease to a non-round charcoal grill assembly is a major improvement over previous non-round charcoal grill assemblies. The ash catcher allows the grill operator to conveniently clean the non-round assembly, whereas before the grill operator may have had to clean the non-round assembly by reaching into the filthy grill pan or inverting the assembly and dumping out the contents. Of course, the addition of the ash catcher to a non-round charcoal grill assembly is made possible by the slope of the four-corner three-angle grill pan shown in FIG. 1b.

Figure 6C:
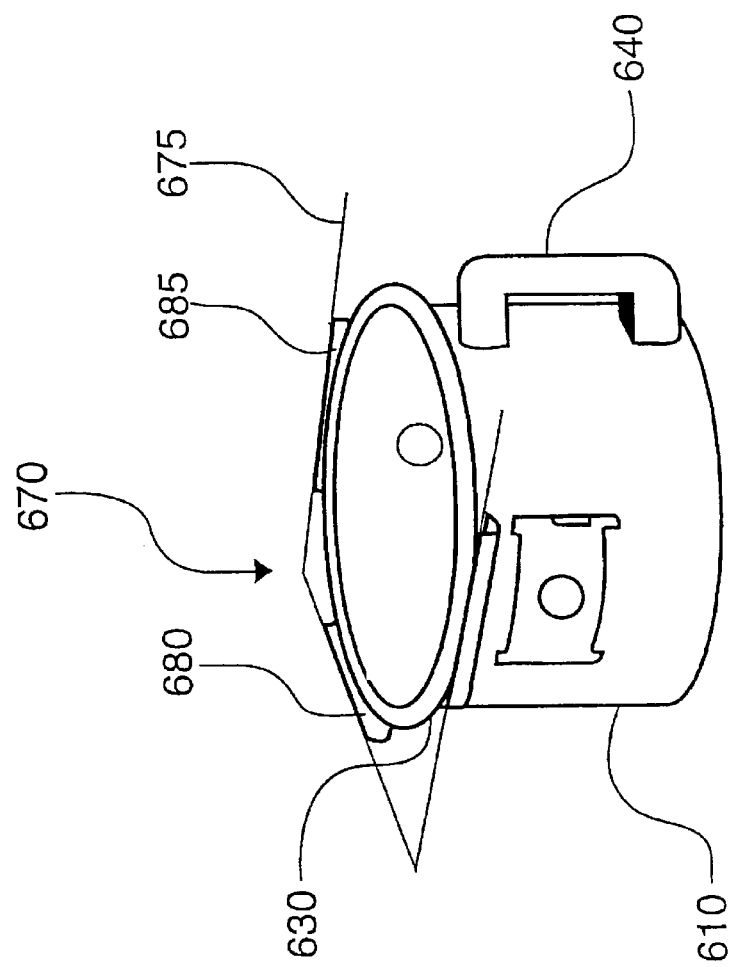
FIG. 6c illustrates a close-up view of the externally removable ash catcher and the mounting of FIGS. 6a–b according to a preferred embodiment of the present invention.

In another embodiment similar to the sliding ash catcher embodiment shown below in FIGS. 6a–c, an ash catcher that is directly removable from the outside of the grill body 515 may be employed. For example, the base of the bottom portion 545 may include a mounting fastened to the underside of the bottom portion 545 and used to position the removable ash catcher 510 underneath the insert aperture 560 as shown in FIGS. 6b and 6c. Thus, the ash catcher 510 may then be slidably positioned and removed.

FIG. 6a illustrates a wheeled charcoal grill assembly 600 according to a preferred embodiment of the present invention. The assembly 600 includes legs 605, an externally removable receptacle for catching ashes or removable ash catcher 610, and a charcoal grill body 615. The legs 605 include wheels 620 and a storage plate 625. The ash catcher 610 includes a ring collar 630, adjustable vents 635, and a handle 640. The grill body 615 is generally similar to the grill body 405 of FIGS. 4a and 4b and includes a four-corner three-angle bottom portion 645, a top portion 650, and hinges (not shown). The top portion 650 includes a handle 655 and a vent 660. The bottom portion 645 includes grid height adjustment levers 662, a mounting 670, and an adjustable cooking grid (not shown). The general shape of the grill body 615 is non-round or preferably rectangular or square. The vertical extent or draw is, as described above, greater then the vertical extent found in a typical charcoal grill. The three-angle bottom portion 645 directs ashes and grease to the center of the bottom portion 645 as described above.

In operation, the grill operator may obtain access to the interior of the grill body 615 by using the handle 655 to raise and rotate the top portion 650 along the hinges that attach the top portion 650 to the bottom portion 645 opposite the handle 655. The grid height adjustment levers 662 may be used to lower or raise the height of the cooking grid inside the bottom portion 645. During the course of cooking, air may be circulated into the covered grill body 615 by adjusting the vent 660 and the vents 635 of the ash catcher 610. The mounting 670 may be used to slidably insert or remove the ash catcher 610 from under the bottom portion 645.

The assembly 600 may be moved by tilting the assembly 600 back on the wheels 620 and rolling the assembly 600 on the wheels 620. The two legs 605 without wheels 620 may be pressed into a supporting surface and prevent the assembly 600 from moving inadvertently. The storage plate 625 may hold food, fuel, or other items, and the storage plate 625 also provides support to the legs 605.

FIG. 6b illustrates the ash catcher 610 removed from the grill body 615 of FIG. 6a according to a preferred embodiment of the present invention. The bottom portion 645 includes an insert aperture 665. In operation, the ash catcher 610 is slidably positioned underneath the insert aperture 665 along the mounting 670 as described below.

FIG. 6c illustrates a close-up view of the externally removable ash catcher 610 and the mounting 670 of FIGS. 6a–b according to a preferred embodiment of the present invention. The mounting 670 includes rails 675 and a stop 680. The rails include grooves 685. The mounting 670 is fastened under the bottom portion 645 shown in FIGS. 6a and 6b. In operation, the ash catcher 610 may be inserted into the rails 675 by fitting the ring collar 630 into the grooves 685 of the rails 675. The handle 640 may be used to guide the ash catcher 610 into the grooves 685 and position the ash catcher 610 along the rails 675. The stop 680 prevents the ash catcher 610 from being slid past the position where the ash catcher 610 is aligned directly below the insert aperture 665 of the bottom portion 645 shown in FIGS. 6a and 6b. The rails 675 are preferably fastened closely to the underside of the bottom portion 645 so that the ash catcher 610 on the rails 675 presses up tightly against the edge of the insert aperture 665. However, in another embodiment the rails 675 may be separated from the underside of the bottom portion 645 by a clearance, and the clearance may be used for ventilation. When the ash catcher 610 is slidably moved against the stop 680 and aligned directly below the insert aperture 665, the assembly 600 may be used to cook. When the cooking is finished, the ash catcher 610 may be slid along the rails 675 in the opposite direction of the stop 680 until the ring collar 630 is no longer contained within the grooves 685 of the rails 675. The ash catcher 610 may then be cleaned by inverting the ash catcher 610 and dumping out the ashes and grease. The ash catcher 610 may then be slid back under the insert aperture 665.

Figure 6D:
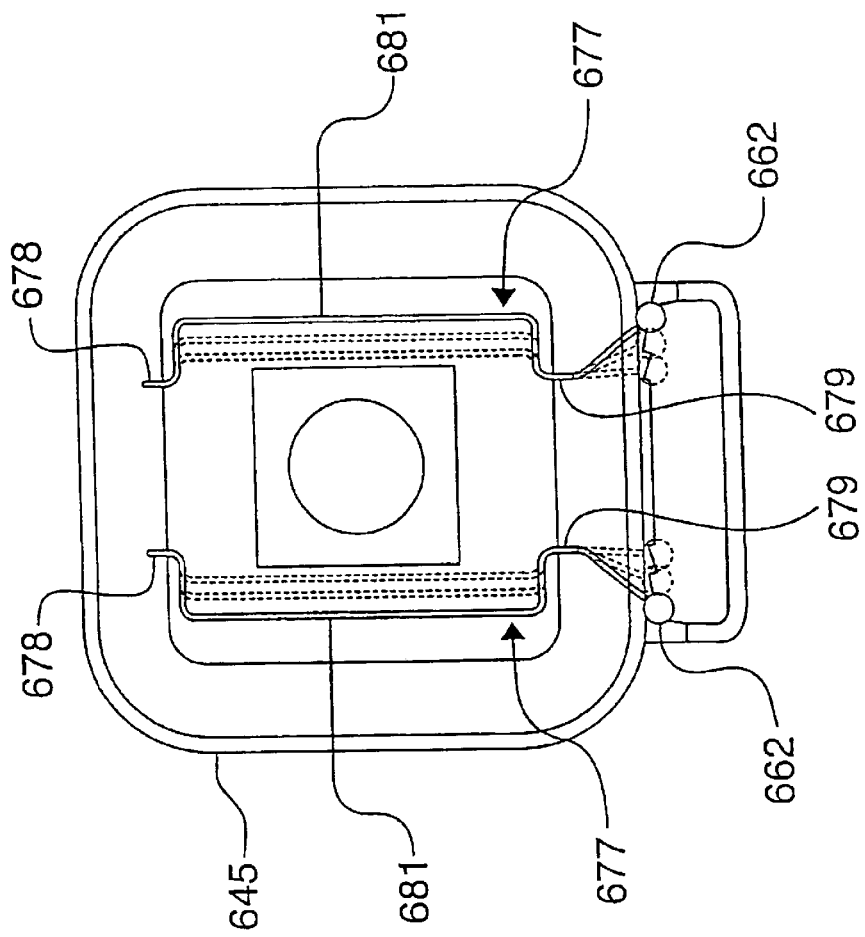
FIG. 6d illustrates a view of the bottom portion of the assembly of FIGS. 6a–b showing grid adjustment rods according to a preferred embodiment of the present invention.

FIG. 6d illustrates a view of the bottom portion 645 of the assembly 600 of FIGS. 6a–b showing grid adjustment rods 677 according to a preferred embodiment of the present invention. The grid adjustment rods 677 include rear fixture portions 678, front fixture portions 679, and grid contact beams 681. The bottom portion 645 includes two sets of oppositely aligned apertures (not shown) in the front and rear of the bottom portion 645. Each set of the apertures provides fixation to one of the grid adjustment rods 677. The front fixture portions 679 extend through the apertures at the front of the bottom portion 645 and are integrally formed with the grid height adjustment levers 662. The adjustable cooking grid may be positioned on top of the support beams 681.

In operation, the apertures suspend the grid adjustment rods 677 within the bottom portion 645. The grid adjustment rods 677 may be rotated within the apertures by repositioning the grid height adjustment levers 662. As the grid height adjustment levers 662 are re-positioned inward or outward, the grid adjustment rods 677 rotate with the support beams 681 upward or downward to raise or lower the adjustable cooking grid positioned on the support beams 681. Thus, the grid adjustment rods 677 may be used to position the cooking grid and any food thereon at a variety of distances from a heat source in the bottom portion 645. The preferred embodiment shown in FIG. 6d illustrates three positions for the grid adjustment rods 677 and grid height adjustment levers 662 represented by the one solid-line rendering and two dotted-line renderings. Of course, the bottom portion 645 may provide greater or fewer positions for the grid adjustment rods 677 and grid height adjustment levers 662.

The addition of an externally removable ash catcher to a non-round charcoal grill assembly is a major improvement over previous non-round charcoal grill assemblies. The externally removable ash catcher allows the grill operator to conveniently clean the non-round assembly, whereas before the grill operator may have had to clean the non-round assembly by reaching into the filthy grill pan or inverting the assembly and dumping out the contents. Of course, the addition of the ash catcher to a non-round charcoal grill assembly is made possible by the slope of the four-corner three-angle grill pan shown in FIG. 1b.

In another embodiment the ash catcher 610 includes a tab and does not include the handle 640 and may be inserted and removed from above as demonstrated by the embodiment shown in FIGS. 4a and 4b above.

Figure 7:
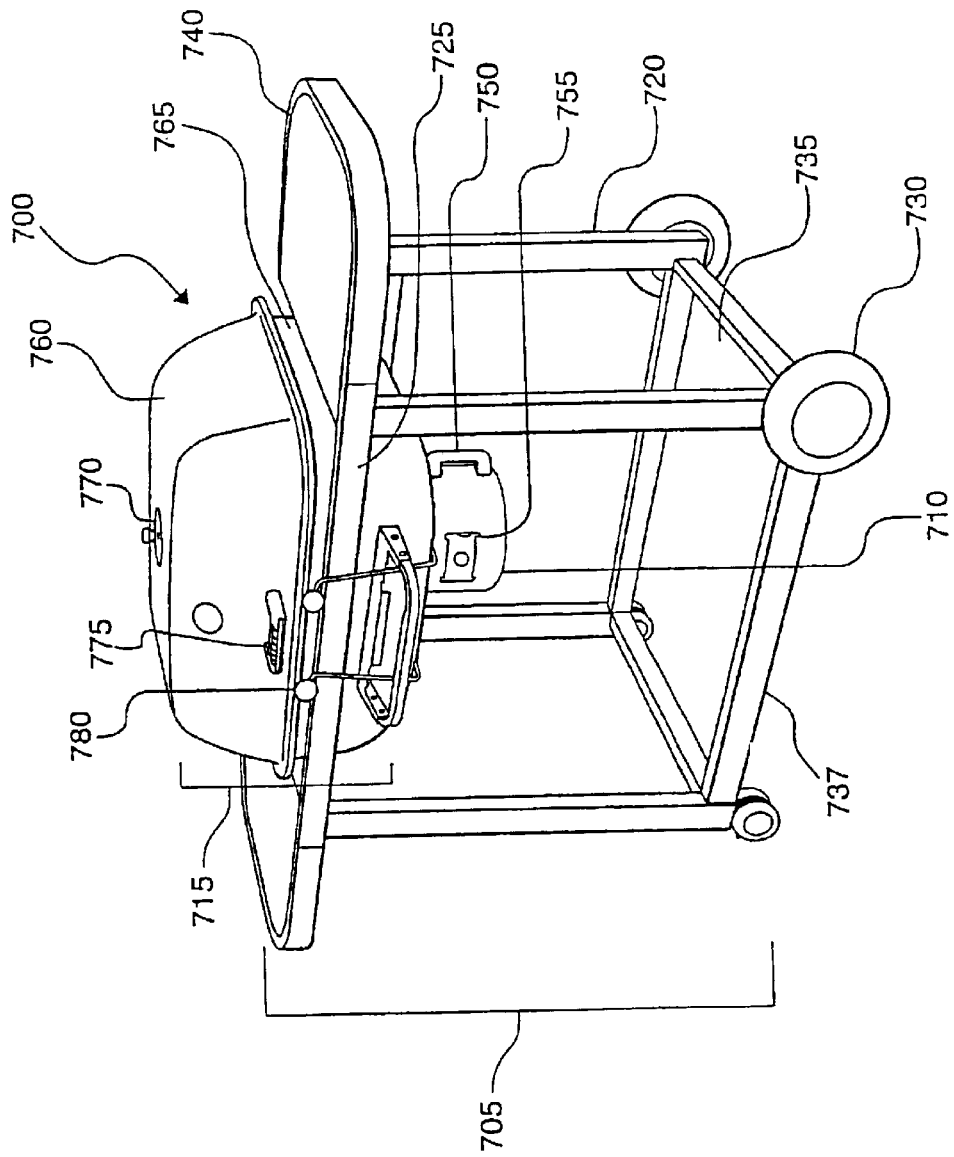
FIG. 7 illustrates a cart mounted charcoal grill assembly according to a preferred embodiment of the present invention.

FIG. 7 illustrates a cart mounted charcoal grill assembly 700 according to a preferred embodiment of the present invention. The assembly 700 includes a wheeled cart 705, a receptacle for catching ashes or ash catcher 710, and a grill body 715. The cart 705 includes legs 720 and a frame 725. The legs 720 include wheels 730, a storage plate 735, and a plate support frame 737. The frame 725 includes trays 740. The ash catcher 710 includes a handle 750, adjustable vents 755, and a ring collar (not shown). The grill body 715 includes a top portion 760, a four-corner three-angle bottom portion 765, and hinges (not shown). The top portion 760 includes a vent 770 and a handle 775. The bottom portion 765 includes grid height adjustment levers 780, a mounting (not shown), and an adjustable cooking grid (not shown).

The grill body 715 and the ash catcher 710 are generally similar to the grill body 615 and the ash catcher 610 of FIGS. 6a and 6b. The general shape of the grill body 715 is non-round or preferably rectangular or square. The vertical extent or draw is, as described above, greater then the vertical extent found in a typical charcoal grill. The three-angle bottom portion 765 directs ashes and grease to the center of the bottom portion 765 as described above.

In operation, the grill body 715 and the ash catcher 710 perform similarly to the grill body 615 and the ash catcher 610 in FIGS. 6a and 6b. The grill operator may obtain access to the interior of the grill body 715 by using the handle 775 to raise and rotate the top portion 760 along the hinges that attach the top portion 760 to the bottom portion 765 opposite the handle 775. The grid height adjustment levers 780 may be used to raise or lower the height of the cooking grid inside the bottom portion 765. During the course of cooking, air may be circulated into the covered grill body 715 by adjusting the vent 770 and the vents 755 of the ash catcher 710. The frame 725 of the wheeled cart 705 supports the grill body 715. The wheels 730 may be used to maneuver the assembly 700. The plate support frame 737 retains the storage plate 735 between the legs 720. The storage plate 735 may hold food, fuel, or other items and provide support to the legs 720. The trays 740 provide space to set plates, cooking utensils, and other items. The ash catcher 710 may be slidably positioned along the mounting and removed from the mounting as demonstrated above by the embodiment shown in FIGS. 6a–c.

The addition of a cart to a non-round charcoal grill body is a significant advancement in the use of a non-round charcoal grill. Previously, grill operators who enjoyed grilling with a non-round charcoal assembly could not experience the conveniences of a cart mounted grill assembly. Non-round grill bodies were not attached to carts because the non-round grill bodies did not include ash catchers, and thus cleaning a grill body on a cart without the use of an ash catcher would have been a difficult task. However, the new four-corner three-angle grill pan may be used to guide ashes and grease into an ash catcher. Since a non-round charcoal grill assembly may now include an ash catcher, the grill operator may easily clean the non-round grill assembly without inverting the non-round grill assembly. Therefore, a non-round charcoal grill assembly equipped with an ash catcher may now be conveniently maneuvered on a wheeled cart like a gas grill assembly or a round charcoal grill assembly.

In another embodiment the ash catcher 710 includes a tab and does not include the handle 750 and may be inserted and removed from above as demonstrated by the embodiment shown in FIGS. 4a and 4b.

Figure 8:
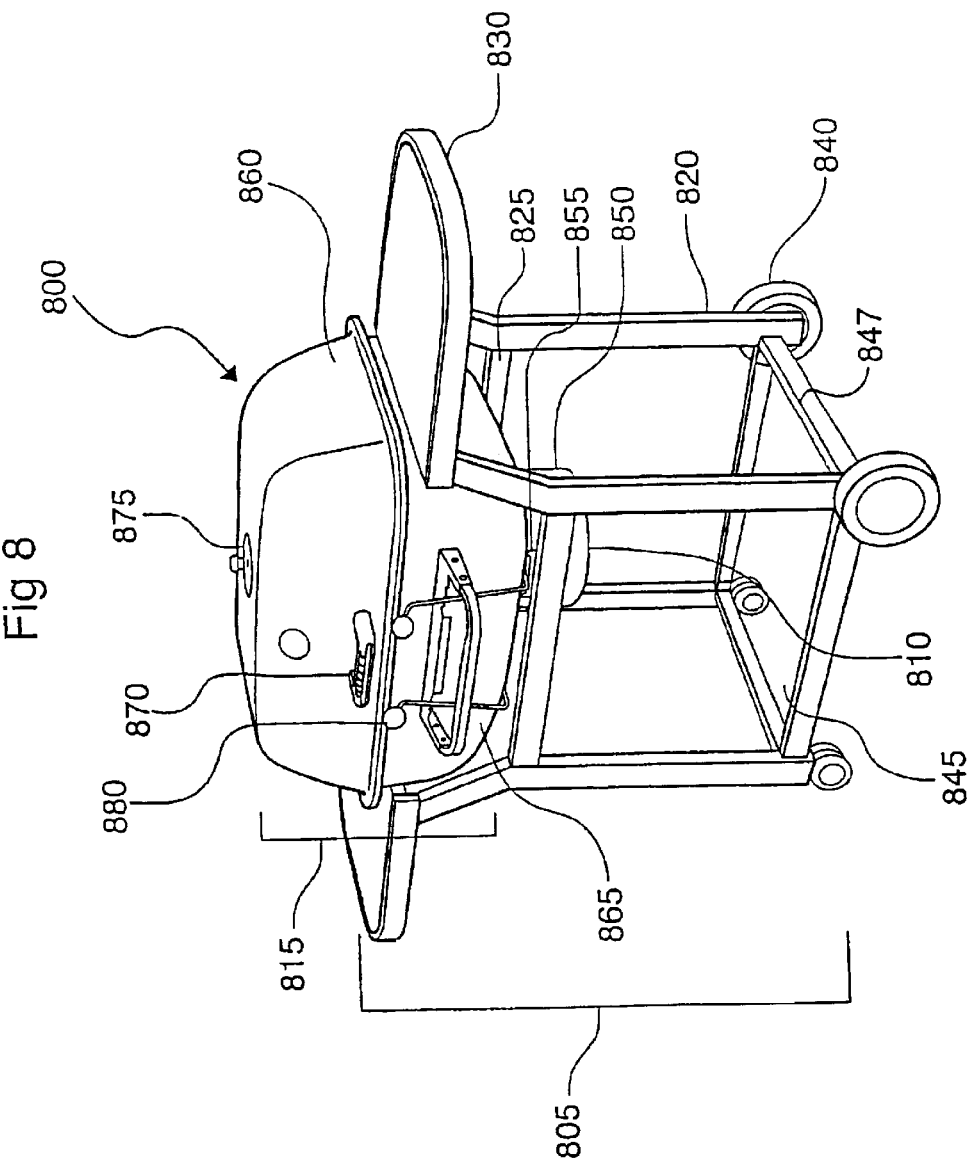
FIG. 8 illustrates a small frame cart mounted charcoal grill assembly according to a preferred embodiment of the present invention.

FIG. 8 illustrates a small frame cart mounted charcoal grill assembly 800 according to a preferred embodiment of the present invention. The assembly 800 includes a wheeled cart 805, a receptacle for catching ashes or ash catcher 810, and a grill body 815. The cart 805 includes legs 820, support rails 825, and trays 830. The legs 820 include wheels 840, a storage plate 845, and a plate support frame 847. The ash catcher 810 includes a handle 850, adjustable vents 855, and a ring collar (not shown). The grill body 815 includes a top portion 860, a four-corner three-angle bottom portion 865, and hinges (not shown). The top portion 860 includes a handle 870 and an adjustable vent 875. The bottom portion 865 includes grid height adjustment levers 880, a mounting (not shown), and an adjustable cooking grid (not shown).

The grill body 815 and ash catcher 810 are generally similar to the grill body 615 and the ash catcher 610 of FIGS. 6a–c. The general shape of the grill body 815 is non-round or preferably rectangular or square. The vertical extent or draw is, as described above, greater then the vertical extent found in a typical charcoal grill. The three-angle bottom portion 865 directs ashes and grease to the center of the bottom portion 865 as described above.

In operation, the assembly 800 performs similarly to the assembly 700 in FIGS. 7a–b. The handle 870 and hinges may be used to raise and lower the top portion 860 as described above. The grid height adjustment levers 880 may be used to raise or lower the height of the cooking grid inside the bottom portion 865. During the course of cooking, air may be circulated into the covered grill body 815 by adjusting the vent 875 and vents 855 of the ash catcher 810. The trays 830 support the grill body 815. For example, the grill body 815 may be fastened or bolted to the trays 830. The trays 830 also provide space to set plates, cooking utensils, or other items. The wheels 840 may be used to maneuver the cart-mounted grill assembly 800. The plate support frame 847 retains the storage plate 845 between the legs 820. The storage plate 845 may hold food, fuel, or other items and provide support to the legs 820. The ash catcher 810 may be slidably positioned along the mounting and removed from the mounting as demonstrated by the embodiment shown in FIGS. 6a–c.

Figure 3B:
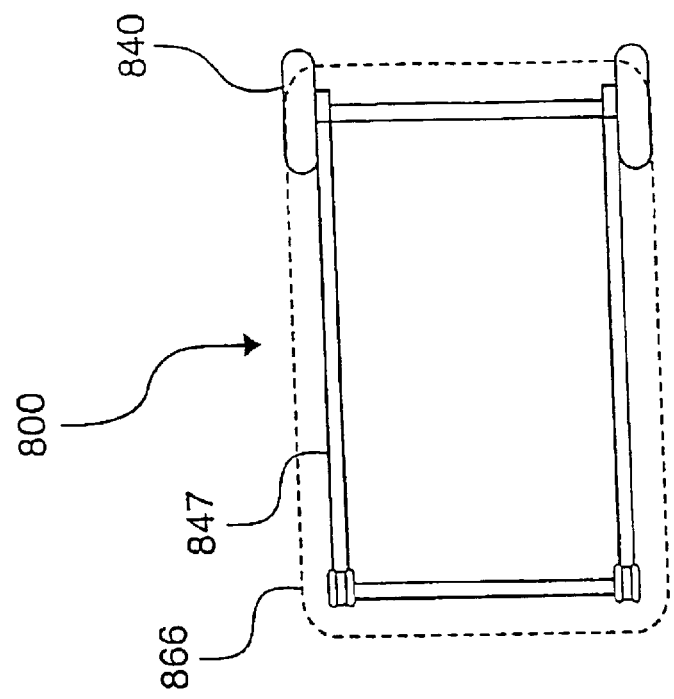
FIG. 3b illustrates the underside of the plate support frame, the wheels, and a perimeter of the bottom portion of the small-cart-mounted assembly from FIG. 8 according to a preferred embodiment of the present invention.
Figure 3A:
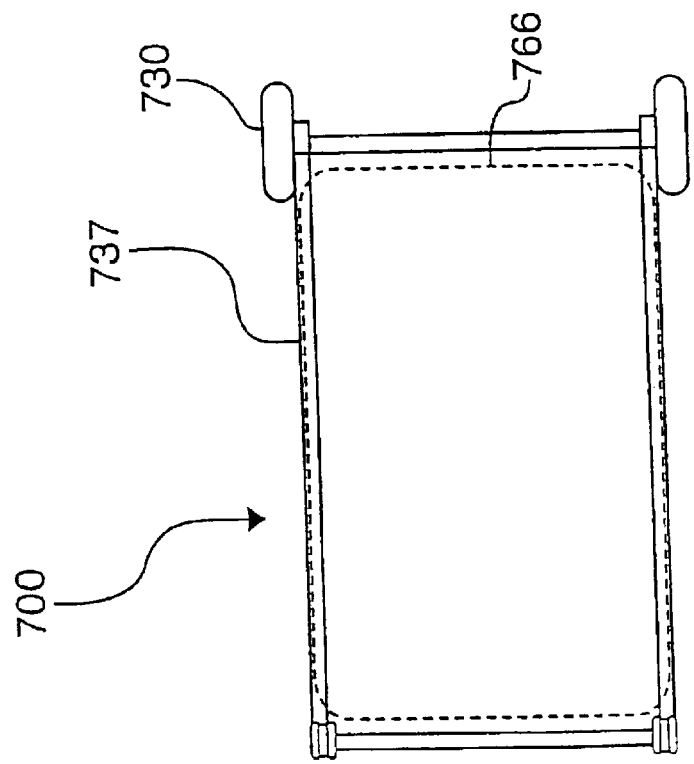
FIG. 3a illustrates the underside of the plate support frame, the wheels, and a perimeter of the bottom portion of the cart-mounted assembly from FIG. 7 according to a preferred embodiment of the present invention.

The geometric extent of the area of the frame of a cart may be described as the footprint of the cart. Preferably, the perimeter of the footprint of the cart is less than the perimeter of the bottom portion of a grill assembly. The bottom portion 865 may be described as substantially similar in size and shape to the bottom portion 765. As shown in FIGS. 3a–b, the footprint of the grill cart 805 of FIG. 8 may be described as smaller than the perimeter of the bottom portion 865 of the assembly 800, but the footprint of the grill cart 705 of FIG. 7 may be described as substantially the same as the perimeter of the bottom portion 765 of the assembly 700. The footprint of the grill cart 805 of FIG. 8 may thus be described as smaller than the footprint of the grill cart 705 of FIG. 7. The grill cart 805 has a reduced footprint because, as shown in FIG. 8, the legs 820 of the grill cart 805 slope up and out along the bottom portion 865 from the support rails 825 located underneath the bottom portion 865 of the grill body 815 instead of encompassing the entire perimeter of the bottom portion 865. Thus, the cart 805 has a smaller interior perimeter or footprint than the cart 705 of FIG. 7 and may therefore be easier to store and maneuver than the cart 705 of FIG. 7.

The assembly 800 is a significant improvement upon previous charcoal grill assemblies. The assembly 800 includes the four-corner three-angle bottom portion 865 which guides ashes and grease into the ash catcher 810. The addition of the ash catcher 810 allows the non-round grill body 815 to be used with a cart 805 because the grill body 815 may be easily cleaned by removing the ash catcher 810. However, the assembly 800 also provides the improvement of a smaller grill cart 805 than the grill cart 705 of FIG. 7 due to the small footprint of the bottom portion 865. Thus, the assembly 800 not only allows a grill operator to enjoy the improved cooking characteristics of a non-round grill body with the convenience of a maneuverable cart, but the assembly 800 also may take up less space than the grill cart assembly 700 of FIG. 7.

In another embodiment the ash catcher 810 includes a tab and does not include the handle 850 and may be inserted and removed from above as demonstrated by the embodiment shown in FIGS. 4a and 4b.

FIG. 3a illustrates the underside of the plate support frame 737, the wheels 730, and a perimeter 766 of the bottom portion 765 of the cart-mounted assembly 700 of FIG. 7 according to a preferred embodiment of the present invention. The perimeter 766 of the bottom portion is shown by a dotted line. The perimeter of the plate support frame 737 may be described as the perimeter of the footprint of the cart 705 as shown in FIG. 7. The footprint may be described as the geometric extent of the area of the frame of a cart. In FIG. 3a, the perimeter of the footprint of the cart 705 is substantially the same as the perimeter 766 of the bottom portion 765 shown in FIG. 7.

FIG. 3b illustrates the underside of the plate support frame 847, the wheels 840, and a perimeter 866 of the bottom portion 865 of the small-cart-mounted assembly 800 from FIG. 8 according to a preferred embodiment of the present invention. The perimeter 866 of the bottom portion is shown by a dotted line. The perimeter of the plate support frame 847 may be described as the perimeter of the footprint of the cart 805 shown in FIG. 8.

The bottom portion 865 of FIG. 3b as shown is the same size as the bottom portion 765 of FIG. 3a. Correspondingly, the perimeter 866 of the bottom portion 865 of FIG. 3b as shown is the same size as the perimeter 766 of the bottom portion 765 shown in FIG. 3a.

Thus, as seen in comparing FIG. 3a and FIG. 3b, the footprint of the cart 805 of FIG. 3b is considerably smaller than the perimeter 866 of the bottom portion 865 of the grill. Recall that in FIG. 3a, the footprint of the cart 705 is approximately the size of the perimeter 766 of the bottom portion 765 of the grill. Consequently, the footprint of the cart 805 of FIG. 3b is smaller than the footprint of the cart 705 of in FIG. 7. Consequently, in operation, the grill cart 805 therefore may require less space for support and may be easier to maneuver than the grill cart 705 because the cart 805 has a smaller footprint.

Figure 3C:
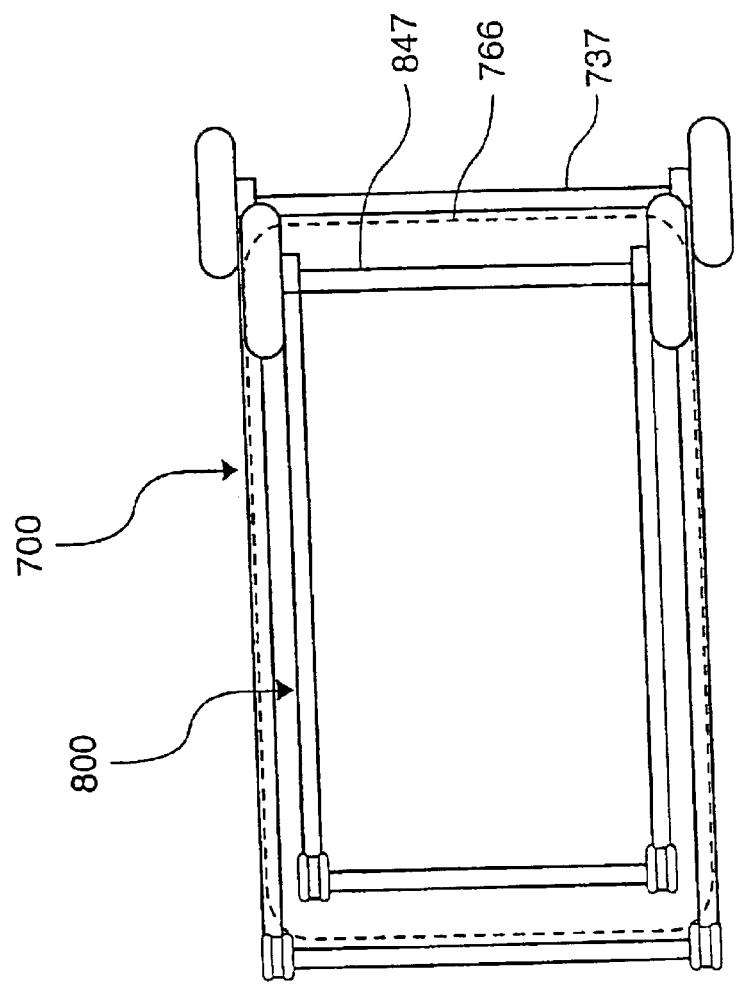
FIG. 3c illustrates FIG. 3a superimposed on FIG. 3b.

FIG. 3c illustrates FIG. 3a superimposed on FIG. 3b. As shown, the difference in the footprints of the two carts 705 and 805 may be more clearly seen. That is, the perimeter of the plate support frame 847 of the standard cart is shown to be greater than the perimeter of the plate support frame 737 of the small-frame cart. Therefore, the small-frame charcoal grill assembly 800 may be easier to store and maneuver or may otherwise be more attractive to a consumer as described above.

As shown in FIGS. 1 and 4–8, the four-corner, three-angle shape of the grill pan provides a slope that directs ashes and grease into the center of the grill pan base. The slope is an important improvement upon prior non-round grill assemblies because the slope allows non-round charcoal grills to include ash catchers. Previously, any grill operator who wanted to use a non-round charcoal grill assembly for the improved burn rate and ventilation characteristics was unable to clean the grill assembly with a removable ash catcher.

The addition of a removable ash catcher to a non-round charcoal grill assembly as embodied in FIGS. 4–8 allows a grill operator to easily remove ashes or other debris that accumulate at the bottom of the grill in the course of cooking without having to turn the grill assembly upside down to dump out the ashes or reach into the dirty grill assembly to clean out the ashes as required by prior art charcoal non-round charcoal grills. Therefore, because of the four-corner three-angle grill pan, grill operators may now quickly and efficiently clean a non-round charcoal grill assembly and avoid the hassles of grill cleaning that come with using other non-round charcoal grill assemblies.

The addition of a non-round charcoal grill assembly with an ash catcher to a wheeled cart as shown in FIGS. 7 and 8 may yield considerable benefits in grilling with a non-round charcoal grill assembly. Until now, a non-round charcoal grill body could not be used with a cart because the non-round body generally had to be cleaned by inverting the body and dumping the ashes. Inverting the grill body is not an easy task when the body is fastened to a cart. Therefore, grill operators who wanted to grill with a non-round charcoal assembly could not experience the advantages of grilling with a cart-mounted grill body. The advantages of the cart include an assembly that is easy to maneuver and plenty of space to set items. However, by including the four-corner three-angle charcoal grill pan of a preferred embodiment of the present invention, a charcoal grill assembly may include an externally removable ash catcher, so consequently a charcoal grill assembly may be attached to a cart. Thus, now a charcoal grill operator may enjoy the advantages of grilling with a non-round charcoal grill while being able to maneuver the grill assembly and store many different items.

The deep draw shown in FIGS. 2 and 4–8 provides more vertical space within the grill body than previous charcoal grill assemblies. The deeper draw allows grill operators to set the cooking grid at a greater variety of heights above the heat source. The extra height options grant the grill operator more control over how food is cooked. The deeper draw allows grill operators to place more food and a greater variety of food in the grill body. Additionally, the deeper draw improves the burn rate of the charcoal during cooking within the grill body. Thus, the deeper draw of the present invention may greatly increase the cooking options of the charcoal grill operator.

The small grill cart of FIG. 8 is a significant improvement because the small grill cart has a small footprint and may therefore be easier to maneuver and store. Because the three-angle slope of the bottom portion reduces the size of the base of the bottom portion, the cart has a reduced footprint. The perimeter of the footprint of the small cart therefore may be described as less than the perimeter of the bottom portion. The small footprint results in a small cart. Because the size of the cart is limited, the small cart may be easy to maneuver and store. Therefore, the four-corner three-angle grill pan improves upon the prior art in two ways in the case of the small cart charcoal grill assembly. The grill pan allows a non-round charcoal grill body to conveniently be used as part of a cart assembly because the grill body may include an ash catcher. Also, the four-corner three-angle grill pan actually allows for a small cart to be used with the non-round grill body.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A charcoal grill including:
   a grill body including:
      a grill lid; and
      a non-round grill pan
   wherein said grill lid is positioned on top of said non-round grill pan to enclose a grilling area, wherein a horizontal cross-section of said grilling area taken at the upper extent of said non-round grill pan is non-round,
   wherein said non-round grill pan includes a base having an aperture; and
   an ash catcher having a ring collar,
   wherein said ash-catcher is vertically introduced into said aperture of said non-round grill pan and is positionally maintained by the contact of said ring collar with said non-round grill pan.

2. The charcoal grill of claim 1 wherein said ash catcher includes a tab to allow the ash catcher to be vertically removed from said aperture.

3. A charcoal grill including;
   a grill body including:
      a grill lid; and
      a rectangular grill pan,
   wherein said grill lid is positioned on top of said rectangular grill pan to enclose a grilling area, wherein a horizontal cross-section of said grilling area taken at the upper extent of said rectangular grill pan is rectangular,
   wherein said rectangular grill pan has an aperture; and
   an ash catcher including a ring collars,
   wherein said ash catcher is vertically introduced into said aperture of said rectangular grill pan and is supported in said aperture by the contact of said ring collar with said rectangular grill pan.

4. The charcoal grill of claim 3 wherein said ash catcher includes a tab to allow the ash catcher to be vertically removed from said aperture.

* * * * *